Jan. 20, 1948.  C. T. ZAHN  2,434,682
DEVICE FOR PRODUCTION OF UNDERWATER SOUND FIELDS
Filed Aug. 18, 1944  2 Sheets-Sheet 1
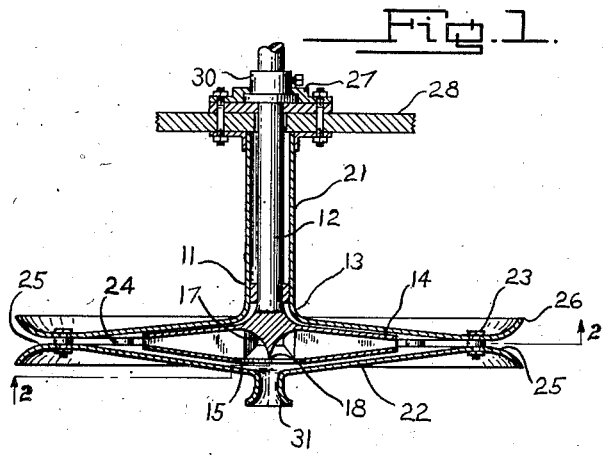
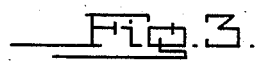
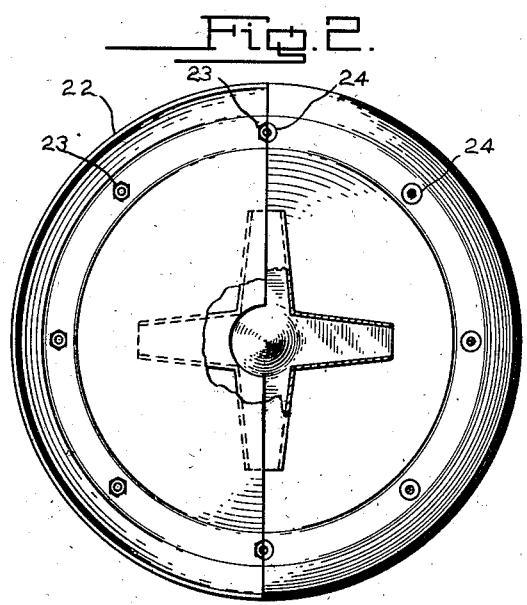
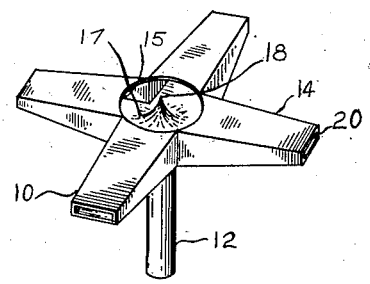
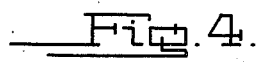
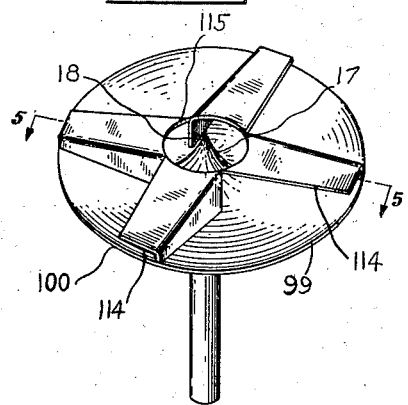
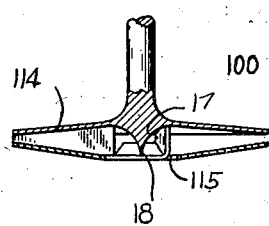
Charles Thomas Zahn.
INVENTOR
BY W. Glenn Jones
ATTORNEY

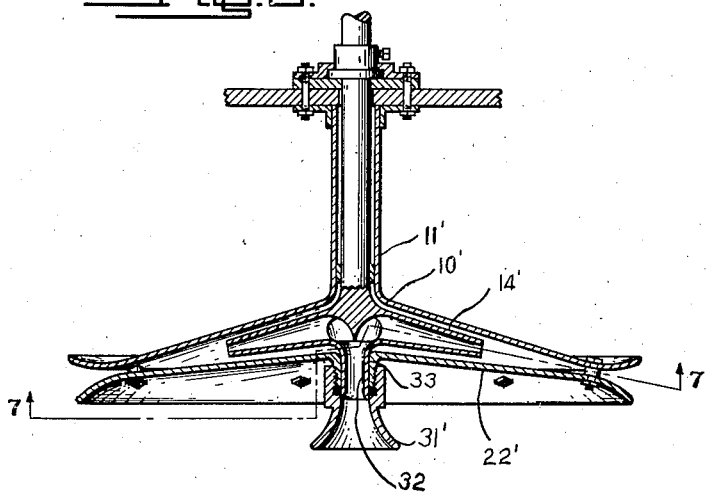
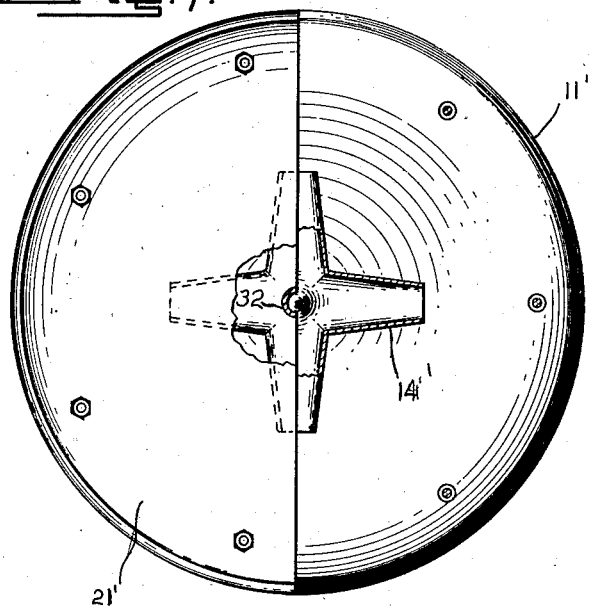

Patented Jan. 20, 1948

2,434,682

UNITED STATES PATENT OFFICE 2,434,682

DEVICE FOR PRODUCTION OF UNDER-WATER SOUND FIELDS

Charles T. Zahn, Dallas, Tex.

Application August 18, 1944, Serial No. 550,119

1 Claim. (Cl. 259—96)

(Granted under the act of March 3, 1883, as amended April 30, 1928; 370 O. G. 757)

This invention relates to a device for production of underwater sound fields and has for an object to provide an improved source of liquid wave-motion capable of agitating a liquid either for the purpose of producing a sound field of desired characteristics in such liquid or for the purpose of mixing the liquid for any of the various purposes for which liquids may be mixed, such as homogenizing, emulsifying, coagulation or breaking down gel structure, etc.

A further object of this invention is to provide a means for producing sound or noise fields and for controlling the frequency characteristics of such fields.

With the foregoing and other objects in view, one form of the invention consists in the construction, combination and arrangement of the parts hereinafter described and illustrated in the drawings, in which:

Fig. 1 is a vertical sectional view of one form of this invention;

Fig. 2 is a sectional view on line 2—2 of Fig. 1;

Fig. 3 is a perspective view of the rotor of this form;

Fig. 4 is a perspective view of slightly different rotor;

Fig. 5 is a section view on line 5—5 of Fig. 4;

Fig. 6 is a view similar to Fig. 1 of a different form, and;

Fig. 7 is a partly sectional view along line 7—7 of Fig. 6.

The source of liquid wave-motion of this invention includes an agitator to be immersed in a liquid such as sea-water or milk, for example, or in liquid containing particles or bubbles of a solid or gaseous nature. It consists essentially of two mechanical parts: (a) a rotor 10 and (b) a fixed housing 11 surrounding the rotor, the device being shaped substantially like a mushroom. In this case the rotor is T-shaped and consists of a central T-stem or shaft 12 at the end of which is attached one or more T-blades or pipe-shaped nozzles 14 with a circular inlet 15 as shown in Fig. 3. The inside of the rotor is shaped into a conical stream-lined mound 17 terminating gradually in a point 18. This rotor 10 is so designed as to provide for the liquid a continuous passage leading into the rotor 10 at the circular inlet 15 where the liquid is spread outward by the conical mound 17 and through the transverse pipes 14 farther outward to the open ends 20 of the nozzles 14 where it leaves the rotor.

The housing 11 is mushroom shaped and consists of two parts, a stem 21 and a head 22, as shown in Fig. 1, held together by bolts 23 and spacers 24 in such a way as to leave a narrow opening 25 for the liquid all around the periphery 26 of the housing head 22. The housing 11 also provides a bearing 27 for the rotor T-stem or shaft 12, and it can be designed, as shown, in such a way as to be mounted on a platform 28 above the housing 11. The vertical position of the rotor 10, relative to the housing 11, can be established by means of a collar 30, as shown, or by some similar device. In the center of the bottom of the housing head 22 a stream-lined inlet 31 is provided, in juxtaposition to the circular inlet 15 in the rotor 10.

In operation this device functions as follows. Initially, when the rotor 10 is at rest, the inside space in the rotor nozzles 14 and the housing head 22 is full of the liquid. As the rotor is set into motion the liquid inside the housing head 22 is dragged around by nozzle pipes 14 on the rotor 10. The excess pressure due to centrifugal action drives the liquid outward through the narrow opening 25 at the periphery 26 of the housing head 22. At the same time liquid is sucked through the housing head inlet 31 and directed into the rotor inlet 15. When the speed of the rotor becomes sufficiently great, a vacuum is created at the center near the axis of rotation. Further increase in speed causes the evacuated region to extend outward, and the liquid surface moves toward the narrow outlet near the periphery of the housing. Finally the speed becomes sufficiently great to drive the inner surface of the liquid out beyond the ends 20 of the rotor pipes 14. A jet of liquid then flows out from each rotor pipe 14 through the vacuum, and impinges on the liquid surface. When the width of the narrow peripheral outlet 25 in the housing head 22 is properly adjusted, the inner surface of the liquid takes an approximately stationary average position at the desired distance from the axis of the rotor. Under such conditions the impact of the liquid issuing from the rotor is sufficient to balance the external liquid pressure.

As the liquid jets impinge on the liquid "surface" near the periphery of the housing, the motion is complicated by turbulence, and a considerable amount of cavitation may occur. Sound is generated as a result both (a) of the direct impact of liquid jets and (b) of the secondary impacts following cavitation. The quality of the noise generated by this device in part depends on the speed of rotation, on the diameter of the rotor, and on the shape of the narrow opening in the housing. By flaring the narrow outlet in the housing in various ways, different qualities and intensities of sound are obtainable. The frequency characteristics also depend on the number of pipes or jets on the rotor.

Figs. 1, 2 and 3 represent primarily a schematic diagram intended to illustrate the principle of operation of one form of the device. Obvious variations in design are conceivable, but the essential features embodied in this invention are as follows. The rotor is so designed as to create a vacuum inside the housing and to throw the liquid surface outward to points in, or near the narrow peripheral opening in the housing. An inlet from the outside, near the rotor axis or inside the rotor shaft, feeds liquid to the rotor. The rotor carries this liquid around until it is thrown outward at increased speed and finally impinges on the surface separating the vacuum from the outside liquid. The periodic impulses from these jets of liquid produce a sound field in the main body of the liquid.

The rotor pipes need not necessarily be completely closed. For example, as in Figs. 4 and 5, the rotor 100 can be made in a disc-shaped form 99, with channels or vanes 114 L-shaped in cross section, so designed as to catch the inflowing liquid from inlet 115 and direct it as desired toward the periphery of the housing. In the design shown in Figs. 6 and 7 the rotor inlet is extended downward at 32 to meet the inlet 31' from the head 22' of the housing 11' in such a way that the inflowing liquid passes from the outside directly into the hollow space inside the rotor. This hollow space consists of the vertical pipe-shaped portion leading directly into a number of approximately transverse nozzles or pipes 14'. The inside of the rotor is stream-lined, as shown, so as to spread the liquid out into jets with a minimum of turbulence. At the bottom, the rotor 10' fits into a bearing 33 near the inlet to the housing.

The matter of vacuum sealing introduces no serious difficulty in practical operation, since the amount of leakage is small compared with the total flow into the large inlet. At the top, where the rotor shaft enters the supporting surface, a water seal can be used to prevent air leakage, when necessary or desirable.

In regard to the trapping of stray liquid at undesirable points, the housing can be so sloped as to prevent such trapping. In the form shown in Fig. 1, the housing bottom 22 is so sloped that any stray liquid runs down to the housing inlet 31 and is picked up by the main stream of inflowing liquid. In the form shown in Fig. 6, the housing bottom 22' is so sloped that any stray liquid runs down to the peripheral outlet in the housing and is picked up by the impinging jets of liquid.

As the liquid leaves the rotor it does not in general move exactly radially outward from the shaft. The channels or vanes on the rotor can, however, be so designed as to control the direction of projection of the liquid, within certain limits, if desired. In addition, the liquid flow can be partially directed by means of vanes properly placed at or near the narrow opening in the housing. Similarly, vanes or baffles outside the housing may be provided for controlling circulatory or translational motion of the liquid outside the housing.

*Approximate theory.*—While the operation of this mechanism is complicated by turbulence and cavitation, one can obtain a rough idea of the lower limit of the required ratio $A/a$, of the inlet and outlet areas, by means of the following approximate theory. All friction is neglected, and it is assumed that a vacuum has been created just inside the inlet. Liquid, therefore, starts its motion, along the moving rotor constraints, at zero pressure. Hence it is immaterial whether the liquid flows as a continuous jet or divides into particles, in so far as concerns its motion up to the time of impact at the outlet. As regards the velocity of the liquid on leaving the rotor, the problem is the same as that of a bead starting with initial radial velocity $V_0$ and moving along a smooth radial wire which rotates at an angular velocity $W$. The well-known solution to this problem in theoretical mechanics gives a tangential velocity $WR$, and a radial velocity $\sqrt{V_0^2+(WR)^2}$ and hence a resultant velocity $V=\sqrt{V_0^2+2(WR)^2}$, where $R$ is the radius of the rotor.

If the ratio of tangential to initial velocities, $p=WR/V_0$, is large, the liquid will leave the rotor at an angle of slightly less than 45° with the radius. If, however, there is considerable distance between the rotor extremity and the outlet area, the liquid will impinge on the outlet with much less tangential velocity at the outlet than it had when leaving the rotor. For vanishingly small rotor radius the liquid would fall radially on the outlet. For further simplicity it is therefore assumed that the full velocity $V$ is radial at the outlet. In any case, the final radial velocity will lie between $$\sqrt{V_0^2+(WR)^2} \text{ and } \sqrt{V_0^2+2(WR)^2}$$

The ratio of final to initial radial velocities can then be written $$q=\sqrt{1+2p^2}=\sqrt{1+2(WR/V_0)^2}$$

In the present application the initial velocity $V_0$ is that of efflux of a liquid of density $d$ into a vacuum from a reservoir at pressure $P_0$. Hence $V_0^2=2P_0/d$. As the liquid particles impinge onto the outer liquid the flow is most complicated. At very high speeds the impinging liquid tends to "cut" through the mass of outer liquid, causing cavities which on collapsing send out secondary wave motions as do water hammers. Steady flow may be reached then only at some distance beyond the place of impact. In any case the calculation of momentum change possible serves to establish a limit necessary in order to balance the outer pressure and thereby prevent collapse of the internal vacuum.

Under steady conditions, $AV_0=av$, where $v$ is the average outward velocity after impact. The rate of loss of momentum per unit time and unit area of outlets; that is, the pressure created by impact, is then $$\frac{A}{a}V_0(V-v)d$$

which from the foregoing can be rewritten $$\frac{A}{a}V_0^2d\left[q-\frac{A}{a}\right]$$

This pressure must equal the pressure of the outer liquid at the outlet, and by Bernouilli's theorem one can write $$\frac{A}{a}V_0^2d\left[q-\frac{A}{a}\right]=P_0/d-V^2/2=\frac{V_0^2-v^2}{2}$$

or $$q=\frac{1}{2}\left[\frac{A}{a}+\frac{a}{A}\right]=\sqrt{1+\frac{W^2R^2d}{P_0}}$$

The latter equation is of value in determining roughly the required relationships necessary to permit the formation of the vacuum and thereby to provide the surface for impact which produces wave motion. It is evident that friction, turbulence, and cavitation may require a greater value of W, or a smaller value of outlet area $a$ than indicated by this equation. Nevertheless, this ideal calculation gives a rough idea of the order of magnitude of the quantities involved.

The above relationship is useful in obtaining a rough idea of the required ratio $A/a$ for different frequencies and different dimensions and numbers of water jets on the rotor.

Advantages of this device are as follows:

(a) Its purely mechanical nature insures ruggedness and simplicity of operation.

(b) Part of the kinetic energy of the liquid, as it is thrown from the rotor, is supplied by the surrounding liquid itself as it flows into the evacuated space inside the housing. Only the remainder needs to be supplied by the rotor. The motion of the liquid is therefore partially self-sustaining.

(c) Variations of rotor speed and number of rotor jets provide a wide range of frequency characteristics, applicable to a wide range of requirements.

(d) Other advantages of this device may be seen by noting the essential differences between this device and the water-siren. The water-siren consists essentially of an inner and an outer member, both containing outlets so arranged that they periodically register with each other, when relatively rotated with respect to each other. Pressure of water in the inner member is periodically released, through the two sets of outlets, into the surrounding water. In order that this release of pressure be effective, the inner member must be in close juxtaposition to the outer member, otherwise the pressure would be dissipated in the space between the two members and little sound would be emitted.

In contradistinction to the water-siren the outlets in the inner member of this invention have no similarity with that in the outer member; and the functioning of the present device depends in no way on the periodic registering of juxtaposed sets of outlets. In fact, such a close juxtaposition would be detrimental. The inner member or rotor of the present device is used primarily (1) to create a suction; (2) to direct; and (3) to accelerate liquid originally falling onto the inner member. The outlet in the outer member consists essentially of just one peripheral slit; whereas the siren requires periodic opening and closing by means of alternate open and closed parts on the periphery of the outer member. Furthermore, the inner member of the present device does not need necessarily to surround the incoming liquid completely, and does not act as a pressure reservoir as in the siren. In fact, the liquid pressure should fall practically to zero before it reaches the inner rotating member. The inner member in no way acts as a pressure outlet as in the siren. Large clearance space must preferably be provided between the inner and the outer members, whereas in the siren this clearance space must necessarily be small. In a water-siren the pressure pulses are obtained by periodically opening and closing the outlets from an inner member containing water at high pressure, whereas in the present device the inner outlets are constantly open, and the pressure pulses are produced not by pressure release but actually by impact of high-speed water after it is thrown from the inner member.

Other modifications and changes in the proportions and arrangements of the parts may be made by those skilled in the art without departing from the nature and scope of the invention, as defined in the appended claim.

The invention described herein may be manufactured and used by or for the Government of the United States of America for governmental purposes without the payment of any royalties thereon or therefor.

What is claimed is:

A source of liquid wave motion comprising a rotor, a housing within which said rotor is rotatable, said rotor and said housing having concentric aligned inlets located in the axis of rotation of said rotor, said rotor including radially extending liquid conducting means, said housing having a substantially circumferential peripherial outlet, the diameter and internal thickness of said housing being substantially greater than the diameter and external thickness of said radial liquid conducting means of said rotor thereby providing a substantial space between said radial means and said housing, said radial liquid conducting means of said rotor comprising a plurality of converging nozzles L-shaped in cross-section extending toward said housing outlet.

CHARLES T. ZAHN.

REFERENCES CITED

The following references are of record in the file of this patent:

UNITED STATES PATENTS

| Number | Name | Date |
|---|---|---|
| 423,285 | Smith | Mar. 11, 1890 |
| 706,473 | Low | Aug. 5, 1902 |
| 783,208 | Kuhl | Feb. 21, 1905 |
| 1,468,226 | Colburn et al. | Sept. 18, 1923 |
| 1,786,264 | Reed | Dec. 23, 1930 |
| 1,819,118 | Preleuthner | Aug. 18, 1931 |
| 2,248,459 | Keisskalt | July 8, 1941 |

FOREIGN PATENTS

| Number | Country | Date |
|---|---|---|
| 396,835 | Great Britain | Aug. 17, 1933 |